March 15, 1949. R. M. HAFF 2,464,761
SENSITOMETER
Filed Jan. 8, 1946 2 Sheets-Sheet 1
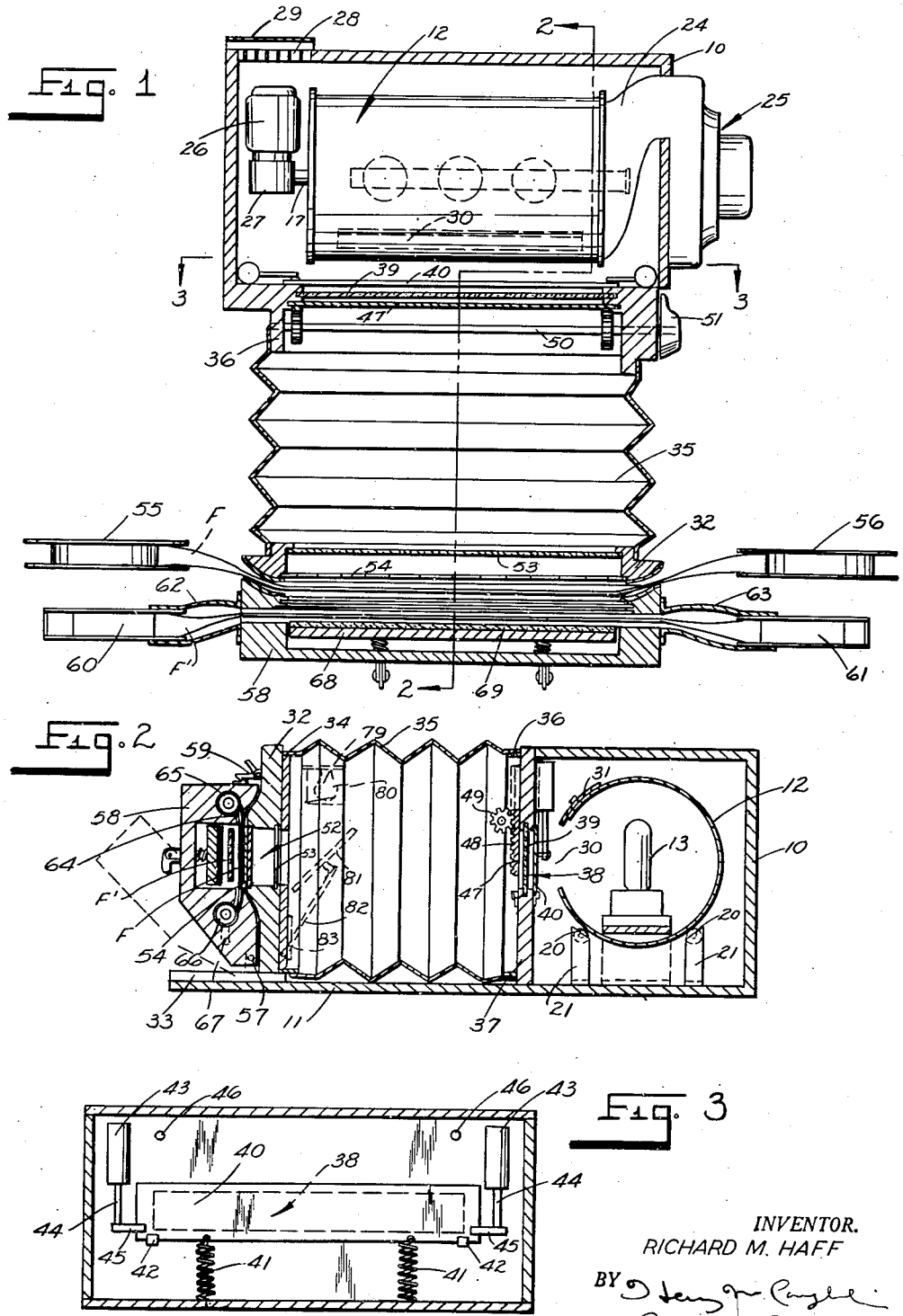
INVENTOR.
RICHARD M. HAFF
ATTORNEYS March 15, 1949.　　　R. M. HAFF　　　2,464,761
SENSITOMETER
Filed Jan. 8, 1946　　　　　　　　2 Sheets-Sheet 2
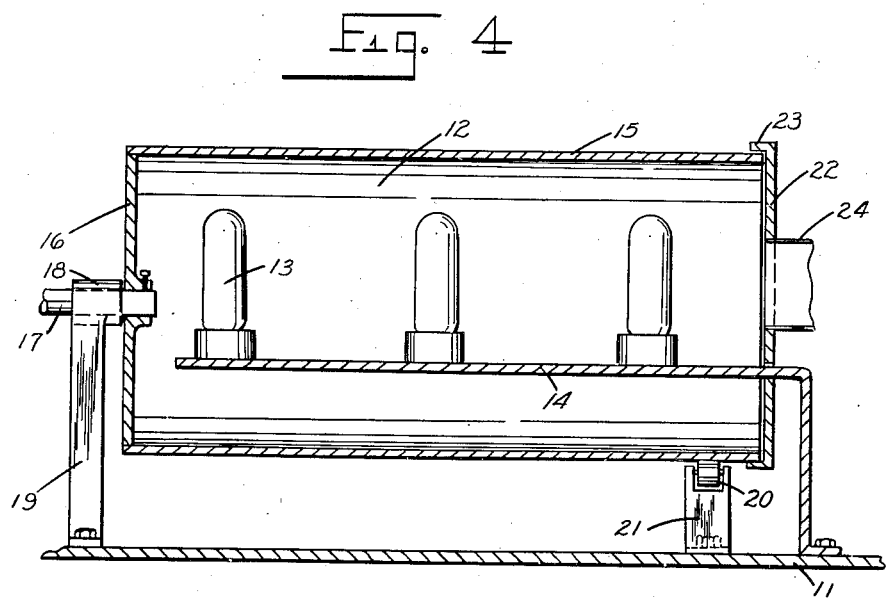
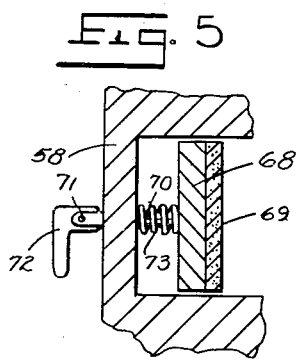
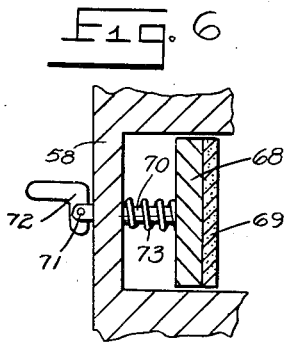
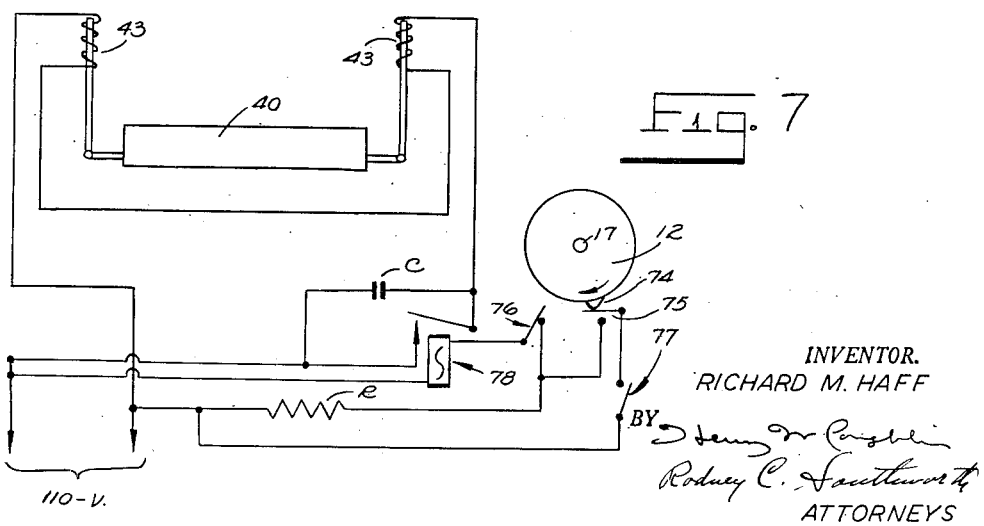
INVENTOR.
RICHARD M. HAFF
ATTORNEYS Patented Mar. 15, 1949

2,464,761

UNITED STATES PATENT OFFICE 2,464,761

SENSITOMETER

Richard M. Haff, Binghamton, N. Y., assignor to General Aniline & Film Corporation, New York, N. Y., a corporation of Delaware Application January 8, 1946, Serial No. 639,737

8 Claims. (Cl. 95—75)

This invention pertains to a sensitometer for determining certain desired information with regard to printing films, such as moving picture films, and more specifically, to determining filter corrections, speed compensation, and other data pertinent to printing color films.

One object of the invention is that of devising an instrument for determining filter correction for original material to be printed as, for example, reversible or negative color film.

Another object of the invention is that of devising an instrument for determining filter correction and speed compensation for copying material, for example, reversible film for making duplicates, positive film or intermediate films of either type.

Another object of the invention is that of devising an instrument which may serve as a laboratory sensitometer for standardizing and controlling release printers especially with regard to lamp intensity, color temperature, and printer light-point adjustment.

Another object of the invention is that of devising an instrument suitable for laboratory work in determining certain factors with regard to filters, exposure requirements of film, and for testing or research work of a general nature pertaining to color films and color printing materials of all types.

Another object of the invention is that of so constructing such an instrument that it may be employed in a lighted room, that is, without resort to a dark room.

Other objects of the invention will become apparent as the description proceeds.

The instrument includes a source of illumination, a chamber enclosing the source of illumination and a shutter operable for giving exposures of predetermined timed intervals. It also includes an aperture through which light controlled by the shutter mechanism passes through various filters for illuminating a number of frames of a so-called original film and printing them, as modified by the said filters, on another film generally referred to as a copy film, duplicating film, or the like. The instrument is so constructed that the copying and original films may be moved to test different scenes on the original, and the aperture, shutter, and other light-controlling means may be suitably adjusted so as to control both the intensity of illumination falling on the printing film and the time of exposure.

The invention will be described by reference to one specific embodiment thereof as exemplified in the accompanying figures of drawing, wherein:

Fig. 1 is a horizontal section taken through the center line of the instrument, certain parts being shown in full.

Fig. 2 is a section taken through Fig. 1 at the lines 2—2.

Fig. 3 is a section taken at the lines 3—3, Fig. 1.

Fig. 4 is a section taken through the vertical center line of the shutter cylinder showing supports for the same and also the supporting means for the sources of illumination.

Figs. 5 and 6 are details of a presser body operable upon the film to maintain it in proper position during exposure.

Fig. 7 is a wiring diagram showing one circuit which may be employed for controlling and timing the vertically reciprocating shutter plate from the rotating shutter cylinder.

Referring to Figs. 1 and 2, the general characteristics of the machine will first be described. A main casing 10 is of more or less rectangular section being considerably longer than its width or height and has its lowermost surface extending or continuing outwardly toward the front of the instrument as shown at 11. This casing houses a shutter cylinder generally designated by numeral 12 and which is illustrated in greater detail at Fig. 4. This shutter cylinder actually encloses the lamps which comprise the light source for effecting exposure. Three lamps 13 are illustrated, but it is to be understood that any desired number may be used. They are supported by a bracket 14 which extends lengthwise of the cylinder and has an angular part secured outside the cylinder end plate being attached to any suitably fixed part of the mechanism, such as the base 11. The exposure or shutter controlling cylinder 12 comprises a cylindrical portion 15 which is permanently attached to an end plate or disk 16 having a hub by means of which it is fixed for rotation with a shaft 17. The shaft 17 passes through a bearing 18 at the upper end of post 19 which is also molded to the base 11. At the opposite end the cylinder is supported for rotation upon two or more rollers 20 rotatable in supporting members 21 also attached to the base 11. These supports and rollers are angularly spaced about the vertical center line of the cylinder as illustrated in Fig. 2. The showing of Fig. 4 has the roller transferred to the vertical center line so as to show the parts in full view rather than dotted.

The end plate 22 has a flange 23 which is of sufficient length to exclude light from passing from the interior of the exposure controlling cylinder to the outer part of the chamber. This end plate 22 has an elongated opening at about its vertical center section at which is connected a duct 24 for introducing cooling air to prevent excessive heating of the interior due to the heat generated by the lamp 13. The bracket 14 also passes through a slot in the end plate 22.

The duct 24 extends outwardly through the end wall of the casing 10 and connects to a blower generally indicated by numeral 25 and which may comprise a fan of any suitable type and a source of power, such as an electric motor.

The cylinder 12 is driven at a predetermined speed by a motor 26 which rotates shaft 17 through reduction gearing enclosed in a housing 27, said reduction gearing being of any conventional type, such as is frequently furnished as a unitary part of small electric motors. The motor 26 should be a synchronous or other constant speed motor which is also adapted to rotate at a predetermined speed so that some angular speed for the cylinder may be accurately maintained.

At the back of the housing 10 is a ventilating system of a type adapted to exclude entry of light. The ventilator consists of a series of apertures 28 covered by a plate 29 spaced a slight distance from the outer surface of the casing so that air blown in at one side of the cylinder, picking up heat as it passes through the cylinder, is thereafter exhausted through the apertures 28 and out of the upper and lower ends of the rectangular space included within the plate 29. Such ventilating means are well known and need not be described in greater detail, and, in fact, any other suitable ventilator permitting exit of air but acting to exclude entry of light may be substituted.

While some special exit for the circulating cooling air may be provided, in actual practice, it is sufficient to permit that air to be exhausted through the exposure opening designated by numeral 30. That opening is variable as to its angular extent by means of the arcuate plate 31 which may be adjusted to close off more or less of the opening 30. Since the speed of rotation for the cylinder 12 is constant and set at some predetermined number of revolutions per minute, the length of exposure is determined by the angular opening at aperture 30. Of course, small openings decrease the time of exposure while larger openings increase that time. The actual intensity of light within the cylinder remains constant and for so much of the mechanism as has been described to this point, the instrument would expose a light sensitive material with illumination of invariable intensity, but with an exposure, the duration of which may be varied within limits.

The light sources 13 are preferably of high intensity type and are operated at a voltage adapted to be maintained at some predetermined figure, or to be controlled as desired, thereby to regulate or maintain the color temperature and output of the lamps. Means for controlling voltage are well known and need not be described at this point.

The interior of the cylinder 12 is preferably a reflector of some type and may be painted white or with aluminum paint, or may be surfaced in some manner appropriate for the purpose. The interior of the casing 10 is a nonreflector and should be painted with a non-lustrous black paint.

The extension or base 11 supports at the front of the instrument a vertically disposed frame 32 slidable on suitable tracks 33, such as are to be found in studio type cameras, projectors, etc. This frame 32 has an extending flange 34 to which is attached a light-tight bellows 35 connected at its other end to a similar flange extending forwardly from the casing 10. The frame 32 and, in fact, the whole front film supporting and filter carrying part of the instrument may be adjusted toward and away from the light source thereby to vary the intensity in a manner well known. Any suitable adjusting means may be employed, such, for example, as the usual rack and gear adjustment provided for cameras or other photographic instruments, the adjustment actually being effected by some suitable manipulating knob.

The front wall 37 of the casing 10 has an elongated opening therein designated by numeral 38 and this opening is provided with a light-diffusing means, a shutter, and a diaphragm or other means for stopping down the opening thereby to control the amount of light passing. The diffusing means includes a window 39 of ground glass for diffusing the light from the sources 13 thereby to equalize the illumination over the entire aperture. A shutter, which is actually a plate 40, is normally maintained in contact with the surface of the wall 37 and is held in aperture-closing position by springs 41, the stops 42 governing the lowermost or closed position of the shutter plate. For opening the shutter a pair of solenoids 43, one at either end, function through plungers 44 and the extensions 45 to raise the shutter plate against the tension of springs 41 until it is stopped upon contacting pins 46. This shutter is timed as will be more thoroughly described in a following paragraph. Briefly, control is governed from a cam on the rotating cylinder 12 so that the shutter opens in time to permit light from sources 13 to pass through the opening 38 as the frame aperture 30 registers with that aperture. The shutter 40 is actually maintained in contact with the wall 37 by guideways (not shown) but of known construction.

Instead of employing springs 41, weights may be used, or, in fact, the weight of the shutter mechanism itself may be sufficient to effect closing thereof. The actual timing of the shutter 40 with respect to the registration of aperture 30 with the aperture 38 is such that the shutter 40 should be completely open just before the leading edge of aperture 30 arrives at the first point where light might pass aperture 38 to effect exposure. It should stay open until the controlling edge of the aperture 30 has passed the opening in wall 37.

A diaphragm 47 is slidable vertically and is positioned at the opposite side of wall 37 from the shutter 40. This diaphragm has at either end a rack 48 with each of which meshes a small pinion 49 fixed to a transverse spindle 50 passing through openings in the projecting flange 36 at the front of the casing 10. This spindle carries a knob and pointer 51 at one end, the said pointer cooperating with a scale (not shown) to indicate the setting of the diaphragm. Preferably the scale is of a nature to correspond to a similar scale on release printers.

The frame 32 has an aperture designated by numeral 52, this aperture preferably being of a size to accommodate 35 mm. film, or any size of film for which the instrument is to be employed. The length of the aperture 52 is such as to permit simultaneous exposure of twelve frames of ordinary 35 mm. movie film. Of course, the instrument may be designed for use in handling film of other sizes and, while a test involving twelve frames has been found to serve satisfactorily, other lengths of film may be tested at a single exposure and, thus, the instrument may be modified accordingly.

The frame 32 carries two filters each of which may be changed to meet certain conditions. The filter 53 is a color correction filter for the purpose of standardizing or correcting for lack of theoretically perfect response in the copying material. A series of filters 53 should be available and these filters are either cyan, magenta, or yellow, or combinations of these, and should be available in different densities.

The other filter carried by the frame 32 and designated by numeral 54 is a color correction filter having twelve different combinations, one for each of the twelve frames to be exposed at each test. These filters may be of the usual yellows, magentas, and cyans and are cemented between thin layers of glass. For most practical purposes, it is sufficient to employ about four complete filters 54, each of which, of course, has the twelve progressively varying yellow, magenta, and cyan layers for their respective frames. To build up density, more than a single filter layer may be cemented in place at any of the twelve frames and, in fact, in most instances it is easier to secure the correct absorption by employing two layers rather than one.

At the sides of the unit, suitable supports are provided for a supply reel 55 and a take-up reel 56 for the original film designated by letter F. The film may be advanced in either direction, and any suitable mechanism may be employed for advancing it. In a simple situation, it is convenient merely to rotate the take-up reel 56 drawing film from the reel 55 until the desired twelve, more or less, frames which are to be exposed are reached. The reels 55 and 56 are suitably frictioned so that once the film has been advanced to a proper point, there is no tendency for it to change position during manipulation of the various parts of the device and controls therefor. Since the filter 54 is divided into a given number of independent filter sections, each of which is different from the preceding either in density or color, or both, it is essential that the film be set so that each of the filter sections will correspond or affect a single frame of the film F.

At the point 57 adjacent the base of the frame 32 is pivoted a carrier 58 for the copy film. While it is not entirely necessary, this carrier is so designed that the instrument may be employed in a lighted room. If desired, the instrument may be used in a dark room in which event some of the refinements herein described as a part of the preferred embodiment may not be incorporated. This carrier 58 may be swung to and from closed position and may be latched in that position by the catch 59, the open position being indicated in the dotted-line showing. At either end of this carrier 58 are secured the magazines 60 and 61. The magazine 60 contains a supply of copy film F' and magazine 61 is adapted to take up that film. It is immaterial what direction the film runs and, thus, the above-mentioned sequences may be reversed. The magazines 60 and 61 are light tight and are connected or held in position by light-tight tubes or casings 62 and 63 through which the film passes as it extends through the carrier and from one side to the other.

At this point, it may be stated that the film reels 55 and 56, also the magazines 60 and 61, may be held horizontally so that no twist in the film will be needed. The twist, as shown in Fig. 1, is not a serious matter since narrow film is quite flexible and the reels and magazines are located far enough from the points of entry and exit for the film so that the angle of twist is very gradual.

If the instrument is to be used in a lighted room, the carrier is provided with a curtain 64 which extends between the rollers 65 and 66. The roller 65 has a spring (not shown) by means of which it always tends to take up the curtain in a manner similar to the mechanism employed in shutters of focal plane type. The roller 66 is provided with a crank and handle 67 by which the curtain may be rolled or drawn from the top roller 65 thereby to bring into alignment with the film an aperture in the curtain such as is well known with respect to the shutters above mentioned. A ratchet (not shown) maintains the curtain in that position until released, whereupon it will automatically be wound back to the top roller in which position it presents an opaque light-excluding blind or shutter between the sensitized film F' and external sources of light.

The carrier 58 is also provided with a presser plate 68 having a sponge rubber or similar surface 69 for bearing against the film. Preferably, the sponge rubber will be provided with a film engaging surface of black plush material. This plate is adapted to be withdrawn as illustrated in Fig. 5 or may be released so that under the influence of a spring or springs, it may bear against the film, pressing both the copy and the original film against the filter 54. The plate 68 has two or more projecting control elements 70 which extend outwardly through openings in the carrier and have pivoted at 71 the thumb-manipulated cams 72 by means of which the plate may be withdrawn or permitted to spring inwardly against the film. Springs 73 serve to push the plate inwardly except when it is drawn out by the cams 72. Fig. 5 shows the elements in outer or withdrawn position while Fig. 6 shows the elements after they have been permitted to move inwardly to clamp or press the film against the filter preparatory to making an exposure.

The frame 32 and the carrier 58 are rounded or curved as shown in Figs. 1 and 2 at those points where the film F enters and leaves, and the surfaces of the elements 32 and 58 are padded or faced with velvet or other soft material so as to exclude passage of light and also for the protection of the film itself. The thicknesses of material and clearances shown vary considerably from the actual dimensions of the device. The scale of the drawings is such that clearances have been accentuated so as to avoid excessive closeness of lines.

The film F' is not moved except when the presser plate 68 is withdrawn, and likewise, the carrier 58 is not swung to open position for permitting movement of film F except when the curtain 64 is in a position to prevent light reaching the sensitized copy film F'.

While suitable friction means at the reels 55 and 56 permits the film F to be advanced to a point where the desired frames register with the filter sections, and normally that film would not move before the frame 58 could be closed thereby clamping the film in position, if desired, projecting pins or other retaining means may be so employed so as positively to prevent movement of the film F thereby assuring that when frames and filter sections have been brought into registration, that relationship cannot thereafter be disturbed. Of course, precise positioning of the copy film F' is not essential since when the carrier has been closed and the presser plate released for clamping the films, further movement of the film F' cannot be possible until after exposure has been completed.

Now referring to Fig. 7, one electrical circuit which may be employed for maintaining synchronization between the movement of the exposure cylinder 12 and the shutter 40 is illustrated. The operation of the device is such that the cylinder 12 should be rotated continuously, or at least, it should be started so as to build up to its predetermined speed of rotation before an exposure is effected. The cylinder 12 is provided with a cam 74 which, during rotation of the cylinder, contacts microswitches 75 and 76. The microswitch 75 is normally in open position while the switch 76 is normally closed. At each rotation of the cylinder 12, the cam 74 closes switch 75 and thereafter opens switch 76. However, the effect of the above-mentioned action is nil so long as the operator of the device does not close a manually controlled switch 77.

The solenoids 43, by means of which the shutter plate 40 is opened, are connected within a circuit supplied with current by, for example, the usual 110-volt source available in most laboratories. Circuit through the solenoid is completed only upon closing a relay 78. The solenoid for the relay 78, as can be seen, is part of a circuit through which current normally flows and in which a resistance R of sufficient amount cuts down the voltage to a value insufficient to close the relay 78, but not enough to permit that relay to open once it has been closed.

To close the relay initially thereby to energize solenoids 43, the manualy operated switch 77 must be closed. The effect is to shunt current around resistance R as the cam 74 contacts an element on the switch 75 thereby closing that switch. Without the resistance R in circuit, the full line voltage through the solenoid at the relay 78 effects a closing thereof, and that relay continues to function even after switch 75 opens upon passage of the cam 74. At that point, or at any time thereafter prior to recontacting switch 75, switch 77 may be opened; it must be open before a second rotation of drum 12 is again started so as not to permit a double exposure. The relay 78 will continue to function and the shutter will be held open until the cam 74 trips microswitch 76, thereby breaking the circuit and permitting the shutter to close under action of springs 41, by gravity, or in any other manner.

To prevent chattering of the relay, a condenser C or other equivalent means may be employed. Cam 74 is preferably adjustable as to its position circumferentially of the cylinder 12, or angularly relatively to the exposure aperture 30. Of course, the microswitches 75 and 76 which are standard electrical elements are also adjustable and thus the timing of the opening and closing of shutter 40 relatively to the time at which the aperture 30 registers with the elongated slot 40 may be adjusted or synchronized.

It is desirable when selecting the original frames to be printed and when registering them with the filter 54 to illuminate them so that they may be viewed by transmitted light. For that purpose, a lamp 79 with a reflector 80 cooperates with a mirror 81 at the end of a swinging arm 82 pivoted at 83. The construction of this arm and pivot are such that the pivot extends outwardly at the ends of the frame 32 and by an operating lever (not shown) the mirror may be moved to and from the position shown in Fig. 2. When in that position and when the lamp 79 is illuminated, reflected light serves to illuminate the filter 54 and the original film F so that the operator, when the carrier 58 is swung to open position, may select and position the appropriate frames which are to be printed.

If desired, the instrument may be rendered more automatic by connecting the swinging carrier 58 with the arm 82 in such manner that as the former is opened, the mirror will be moved to the position of Fig. 2, and vice versa. A further refinement also provides for switching on the lamp 79 at that time and for disconnecting it or switching it off as the mirror is moved to inactive position and as the carrier 58 is opened.

While the same has not been illustrated here, the curtain 64 may also be automatically controlled so that the carrier 58 may not be opened except at such times as the curtain is in closed or light-excluding position. Such automatic control may be extended to open the curtain when the carrier 58 is in closed position.

*Operation*

While the instrument may be employed for many different purposes, its operation will be described relatively to testing color film to determine various factors relative to printing it. The instrument must be set up and the original film F and a suitable copy film of any of the types above mentioned, or for which the instrument may be used, loaded in proper relationship to other parts. The lamps 13 are turned on and brought to proper intensity and color temperature by control of current and voltage. The front movable frame 32 is then racked in or out to a predetermined distance so that intensity of illumination is fixed at some predetermined value. Then the diaphragm 47 is opened or closed by means of the knob 51, the attached pointer being set opposite the scale at a value appropriate for the material and purposes for which the instrument is being employed.

Filter 53 is selected in accordance with data generally furnished with the copying material or as determined by appropriate tests. Then the filter 54 is selected, it being understood that this filter may have to be determined eventually more or less by trial and error. By inspection of the original film F, skilled technicians may choose approximately the proper filter, or more properly, combination of filters which go to make up the complete filter designated by numeral 54.

Then the selection of those frames in the original which are to be printed must be made. That is facilitated by employment of the lamp 79 and mirror 81, or the film F may be extended outside the instrument itself and examined by other light. The selected frames are eventually brought into registration with the sections of filter 54 and secured in place by properly positioning the frictioned reels 55 and 56.

If the copying material F' was not loaded in darkness, or if for some other reason the material in the carrier 58 and extending to the take-up reel 61 may be fogged, the film is advanced so as to bring a length of fresh film into position.

The carrier 58 is then closed and latched whereupon the curtain 64 is wound from the roller 65 until the aperture provided by the slit in the curtain registers with the film, filters, etc. It is to be understood that the lamp 79 will have been turned off before the curtain shutter is opened and that mirror 81 has also been moved out of its so-called active position. The presser plate 68 is then released and pushes the films F' and F into contact with the filter 54. The film F' may be rather sharply bent by the corners of the presser plate, but it is to be understood that the actual thickness of material at the curtain guiding portion of the swinging carrier is less than actually shown in these figures. Also, all edges are rounded so that no damage is done. Of course, the distortion of the film comes outside the picture area anyway.

If the exposure drum 12 has not been previously started, it is set into motion at this time and is given a sufficient period within which to build up its speed, although its actual speed is so slow that the time required for it to reach speed is not great. By means of the switch 77, the shutter 40 is caused to open and to close thereby effecting exposure of the sensitized material through the filters 53 and 54. The switch 77 must be released prior to a time when cam 74 might strike the microswitch 75 a second time.

After exposure, the presser plate 68 is withdrawn and film F' is wound on to its take-up reel whereupon other exposures may be made varying the light intensity either by opening or closing the diaphragm, or by racking the front portion of the instrument to or from the light source.

If another exposure using a different filter combination, or if another exposure of a different portion of the original is to be made, the film is advanced as above stated, the shutter curtain closed, so that carrier 58 may be swung to open position for permitting change either of filters 53 or 54 or for advancing the film F so as to print some other portion thereof. Thereafter, the instrument is closed and the process repeated.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a sensitometer, the combination of a light-tight chamber, a source of illumination within said chamber, an extension to the chamber at one wall thereof including a bellows and a frame, a shutter cylinder enclosing said source of illumination and means for rotating said cylinder at a predetermined angular speed, an aperture in said cylinder through which light from said source may pass, and a similar aperture in that wall of said chamber from which the bellows and frame form an extension, light-diffusing means and, means for varying the effective opening of said aperture in said chamber wall, and a shutter for said last-mentioned aperture and means for opening and closing said shutter in synchronism with the rotation of said cylinder, color correction filters carried by said frame, one of said filters comprising a plurality of sections each of which is of a size corresponding to the frame of pictures to be printed, said sections varying in color and in density, a carrier hinged to said frame adapted to be locked in a closed position or swung to an open position, means adjacent said frame and carrier for supporting an original film to be printed, said carrier when in closed position, functions to maintain said original film in position for printing, light-tight closure means attached to said carrier for supporting an unexposed film and means for excluding light therefrom including an apertured curtain, and a presser plate for pressing both films into contact with said color correction filter when the said carrier is in closed position.

2. In a sensitometer, the combination of a light-tight chamber, a source of illumination within said chamber, an extension to the chamber at one wall thereof terminating in a frame having therein an exposure aperture, a shutter cylinder enclosing said source of illumination and means for rotating said cylinder at a predetermined angular speed, an aperture in said cylinder through which light from said source may pass and a similar aperture in that wall of said chamber from which the extension projects, light-diffusing means in the aperture in said chamber wall, means for varying the effective opening of said last-mentioned aperture, a shutter therefor and means for opening and closing said shutter including means functioning in synchronism with said rotating cylinder, color correction filters carried within the exposure aperture in said frame, one of said filters comprising a plurality of sections, each of which is of a size corresponding to the frame of pictures to be printed, said sections varying in color and in density, a carrier hinged to said frame adapted to be locked in closed position or swung to an open position, means adjacent said frame and carrier for supporting an original film and other means supported by said carrier for supporting an unexposed film to be printed, means for pressing said films into contact with each other and against one of said filters, said means including a pressure plate and manually engaged means for withdrawing said plate from contact with the said film thereby to permit advancing the film.

3. A sensitometer as defined in claim 2 in which the said exposure opening in the shutter cylinder is provided with masking means adjustable to close off a part of said opening.

4. Mechanism as defined in claim 2 in which the said means for varying the effective opening of the aperture in the chamber wall comprises a slidable plate and a rack and pinion control therefor, and manually movable means outside the light-tight chamber by which said plate may be adjusted.

5. A sensitometer as defined in claim 2 wherein the carrier for the unexposed film to be printed has a light-excluding means including an apertured curtain positioned at the open side of said carrier and movable to and from positions wherein said aperture registers with the film to be printed and with the color correction filters carried by the said frame.

6. A sensitometer as defined in claim 2 wherein means is provided for illuminatnig the original film so that it may be observed by transmitted light, said means comprising a lamp within the extension to the said light-tight chamber, and a mirror movable to and from a position in which rays from said lamp are reflected through the color correction filters and the film positioned in alignment therewith.

7. In a sensitometer, the combination of a light-tight chamber, a source of illumination within said chamber, an extension to the chamber at one wall thereof terminating in a frame having therein an exposure aperture, means upon which said frame may be moved to and from said chamber and a light-tight bellows connecting said frame to the chamber wall, a shutter cylinder enclosing said source of illumination and means for rotating said cylinder at a predetermined angular speed, an aperture in said cylinder through which light from said source may pass and a similar aperture in that wall of said chamber from which the extension projects, light diffusing means in the aperture in said chamber wall, means for varying the effective opening of said last-mentioned aperture, a shutter therefor and means for opening and closing said shutter including means functioning in synchronism with the said rotating cylinder, color correction filters carried within the exposure aperture in said frame, said filters comprising a plurality of sections, each of which is a size corresponding to the size of pictures to be printed, said sections varying in color and in density, a carrier hinged to said frame for movement to and from open and closed positions and locking means for retaining said carrier in closed position, means adjacent said frame and carrier for supporting an original film in alignment with said exposure aperture in the frame and other means supported by said carrier for supporting an unexposed film to be printed, presser means in said carrier for retaining said films in contact with each other and against the said filters in the frame, and manually engaged means for moving said presser means to release pressure on the film thereby to permit it to be advanced after each exposure.

8. Mechanism as defined in claim 7 in which said carrier is further provided with a light-excluding curtain, said curtain being movable and having an aperture therein so that in one position, the aperture may be aligned with the film exposure aperture and in another position the said curtain may be caused to cover the unexposed film when the carrier is swung to open position.

RICHARD M. HAFF.

REFERENCES CITED

The following references are of record in the file of this patent:

UNITED STATES PATENTS

| Number | Name | Date |
| --- | --- | --- |
| 1,162,666 | Thimbach | Nov. 30, 1915 |
| 1,287,436 | Remington | Dec. 10, 1918 |
| 1,812,448 | Reilly et al. | June 30, 1931 |
| 1,832,294 | Gent | Nov. 17, 1931 |
| 1,883,884 | Doran | Oct. 25, 1932 |
| 1,925,355 | Whitson | Sept. 5, 1933 |
| 2,133,011 | Black | Oct. 11, 1938 |
| 2,223,008 | Michaelis | Nov. 26, 1940 |

OTHER REFERENCES

Jones (Pub.), "Journal of the Society of Motion Picture Engineers," vol. XVII, No. 4, October 1931, pages 540 to 543, inclusive.